United States Patent
Suzuki et al.

(10) Patent No.: US 11,994,216 B2
(45) Date of Patent: May 28, 2024

(54) SLIDING COMPONENT

(71) Applicant: Eagle Industry Co., Ltd., Tokyo (JP)

(72) Inventors: Hiroshi Suzuki, Tokyo (JP); Yuichiro Tokunaga, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/908,699

(22) PCT Filed: Apr. 7, 2020

(86) PCT No.: PCT/JP2020/015742
§ 371 (c)(1),
(2) Date: Sep. 1, 2022

(87) PCT Pub. No.: WO2021/205554
PCT Pub. Date: Oct. 14, 2021

(65) Prior Publication Data
US 2023/0160475 A1 May 25, 2023

(51) Int. Cl.
*F16J 15/34* (2006.01)

(52) U.S. Cl.
CPC .................. *F16J 15/3412* (2013.01)

(58) Field of Classification Search
CPC .... F16J 15/00; F16J 15/16; F16J 15/50; F16J 15/52; F16J 15/34; F16J 15/3408; F16J 15/3412; F16J 15/3416; F16J 15/342; F16J 15/3424
USPC ........................................................ 277/399
See application file for complete search history.

(56) References Cited

U.S. PATENT DOCUMENTS

| | | |
|---|---|---|
| 2005/0212217 A1 | 9/2005 | Tejima |
| 2011/0215531 A1* | 9/2011 | Tokunaga ............... F16J 15/34 |
| | | 277/399 |
| 2011/0233872 A1 | 9/2011 | Iguchi et al. |
| 2018/0017163 A1 | 1/2018 | Hosoe et al. |
| 2019/0285115 A1* | 9/2019 | Negishi ................ F16C 33/741 |
| 2020/0158162 A1 | 5/2020 | Imura et al. |

FOREIGN PATENT DOCUMENTS

| | | |
|---|---|---|
| CN | 102022542 A | 4/2011 |
| CN | 106015572 A | 10/2016 |
| JP | 2005-180652 A | 7/2005 |
| JP | 2010-133496 A | 6/2010 |

(Continued)

OTHER PUBLICATIONS

International Search Reported dated Jun. 16, 2020, Application No. PCT/JP2020/015742; English translation included, 4 pages.

(Continued)

*Primary Examiner* — Nathan Cumar
(74) *Attorney, Agent, or Firm* — Rankin, Hill & Clark LLP

(57) ABSTRACT

A sliding component includes a pair of sliding members being slidable relative to each other on sliding surfaces of the sliding members. In the sliding component, one of the sliding surfaces includes a dimple group in which a plurality of dimples is arranged. Each of the dimple has an opening portion whose shape has a long axis and a short axis orthogonal to the long axis. In the dimple group, the dimples are arranged along a curve having a curvature different from a curvature of a circumference of the one of the sliding surfaces.

10 Claims, 8 Drawing Sheets

(56) References Cited

FOREIGN PATENT DOCUMENTS

| JP | 5456772 B2 | 4/2014 | |
|---|---|---|---|
| WO | 2016/129553 A1 | 8/2016 | |
| WO | 2018/212144 A1 | 11/2018 | |
| WO | WO-2018212144 A1 * | 11/2018 | .............. F16C 17/04 |
| WO | WO-2019069887 A1 * | 4/2019 | .......... F16C 33/6681 |

OTHER PUBLICATIONS

Written Opinion of the International Searching Authority dated Jun. 16, 2020, Application No. PCT/JP2020/015742, 4 pages.
Japanese Office Action dated May 30, 2023 issued in corresponding Japanese application No. 2022-513756; Partial English translation included (5 pages).
Extended European Search Report dated Sep. 14, 2023, Application No. 20929917.1; 7 pages.

* cited by examiner

SLIDING COMPONENT

TECHNICAL FIELD

The present invention relates to a pair of sliding components that slide relative to each other by sliding surfaces, for example, a mechanical seal, a sliding bearing, and other sliding components suitable for a sliding portion. In particular, the present invention relates to a sliding component including a sealing ring or a bearing that is required to have fluid interposing between sliding surfaces to reduce friction and prevent fluid from leaking from the sliding surfaces.

BACKGROUND ART

As a sealing device configured to prevent leakage of sealed fluid, there is known a sealing device (for example, a mechanical seal) including a pair of sliding components that relatively slide on sliding surfaces. In such a sealing device, it is necessary to maintain favorable sealing performance while reducing sliding torque by forming a fluid lubrication film by the sealed fluid between the sliding surfaces. As one method for achieving favorable sealing performance and low sliding torque, there is known a technique of arranging a plurality of dimples in a sliding surface.

For example, it is known that favorable sealing performance and low sliding torque may be achieved by arranging dimples each including a circular opening portion in a sliding surface on a virtual circumference line having a center coincide with a rotation center of a sliding component. (For example, see Patent Literature 1).

In addition, it is also known that dimples each including an elongated rectangular opening portion whose end portion is semicircular are arranged at a predetermined dimple angle θ, and a ratio L1/L2 of a dimple circumferential length L1 on a circle passing through a dimple center to a circumferential length L2 of a land portion between adjacent dimples on the same circle is set to $0.001 \leq L1/L2 \leq 0.1$, thereby optimally adjusting sealing performance and sliding torque of the dimples as a whole (see, for example, Patent Literature 2).

CITATION LIST

Patent Literature

Patent Literature 1: JP-A-2010-133496
Patent Literature 2: Japanese Patent No. 5456772

SUMMARY OF INVENTION

Technical Problem

According to the technique of Patent Literature 1, even though favorable sealing performance and low sliding torque may be achieved under specific operating conditions, the favorable sealing performance and low sliding torque cannot be achieved in a wide rotation speed range.

In addition, according to the technique of Patent Literature 2, since the dimple angle is fixed, even though leakage of sealed fluid and sliding torque may be reduced under specific operating conditions, favorable sealing performance and low sliding torque cannot be achieved in a wide rotation speed range. In particular, when used in reverse rotation, there is a tendency that the sealing performance is lowered and the sliding torque is increased.

An object of the present invention is, a pair of sliding components that relatively slide on sliding surfaces, to provide the sliding components capable of achieving favorable sealing performance and low sliding torque regardless of a rotation direction and when used in a wide rotation speed range.

Solution to Problem

In order to solve the above problem, a sliding component of the present invention is:

a pair of sliding members being slidable relative to each other on sliding surfaces of the sliding members.

At least one of the sliding surfaces includes a dimple group in which a plurality of dimples is arranged, each of the dimple having an opening portion whose shape has a long axis and a short axis orthogonal to the long axis, and in the dimple group, the dimples are arranged along a curve having a curvature different from a curvature of a circumference of the sliding surface.

According to this feature, in the dimple group, the dimples are arranged along the curve having the curvature different from the curvature of the circumference of the sliding surface, so that angles of the dimples gradually change along the curve. As a result, since dimples having different suction effects and dynamic pressure effects are included, the dimple group as a whole can exhibit favorable sealing performance and low sliding torque over a wide rotation speed range.

The sliding component according to the present invention is characterized in that the dimple group includes a first dimple group in which the dimples are arranged along a curve that is convex toward a sealed fluid side of the sliding component.

According to this feature, since the dimples in the first dimple group are arranged along the curve that is convex toward the sealed fluid side, angles of the dimples gradually change along the curve that is convex toward the sealed fluid side. As a result, the first dimple group includes dimples having different suction effects and dynamic pressure effects, so that the dimple group as a whole can exhibit favorable sealing performance and low sliding torque over a wide rotation speed range, and further, a dimple group capable of bidirectional rotation can be easily formed.

The sliding component according to the present invention is characterized in that the first dimple group is arranged on a leakage side of the sliding surface.

According to this feature, since the first dimple group is arranged on the leakage side, fluid from the leakage side is suctioned by the first dimple group, and thus sealing performance can be improved.

The sliding component according to the present invention is characterized in that the dimple group includes a second dimple group in which the dimples are arranged along a curve that is convex toward a leakage side of the sliding component.

According to this feature, since the dimples in the second dimple group are arranged along the curve that is convex toward the leakage side, angles of the dimples gradually change along the curve that is convex toward the leakage side. As a result, the second dimple group includes dimples having different suction effects and dynamic pressure effects, so that the dimple group as a whole can exhibit favorable sealing performance and low sliding torque over a wide rotation speed range, and further, a dimple group capable of bidirectional rotation can be easily formed.

The sliding component according to the present invention is characterized in that the second dimple group is arranged on a sealed fluid side of the sliding surface.

According to this feature, since the second dimple group is arranged on the sealed fluid side, fluid from the sealed fluid side is suctioned by the second dimple group, and the fluid is pressurized and supplied to the sliding surface, so that a fluid film is formed on the sliding surface, and thus sliding torque can be reduced.

The sliding component according to the present invention is characterized in that the dimple group includes: a first dimple group in which the dimples are arranged along a curve that is convex toward a sealed fluid side of the sliding component; and a second dimple group in which the dimples are arranged along a curve that is convex toward a leakage side of the sliding component.

According to this feature, since the dimples in the first dimple group are arranged in the curved shape that is convex toward the sealed fluid side, and the dimples in the second dimple group are arranged in the curved shape that is convex toward the leakage side, so that the first dimple group and the second dimple group can change angles of the dimples along the respective curves, and thus the dimple groups as a whole can exhibit favorable sealing performance and low sliding torque over a wide rotation speed range, and further, dimple groups capable of bidirectional rotation can be easily formed.

The sliding component according to the present invention is characterized in that the first dimple group is arranged on the leakage side of the sliding surface, and the second dimple group is arranged on the sealed fluid side of the sliding surface.

According to this feature, since the first dimple group arranged on the leakage side can improve sealing performance, and the second dimple group arranged on the sealed fluid side can improve lubricity, a sliding component with favorable sealing performance and lubricity can be achieved.

The sliding component according to the present invention further includes:

a circumferential groove extending in a circumferential direction and disposed between the first dimple group and the second dimple group.

According to this feature, interference between the first dimple group and the second dimple group can be prevented by the circumferential groove extending in the circumferential direction between the first dimple group and the second dimple group.

The sliding component according to the present invention is characterized in that the sliding surface includes a plurality of regions partitioned by land portions extending in a corresponding radial direction, and the dimple group is disposed in one of the regions.

According to this feature, since fluid flowing through the dimple group is dammed and pressurized by the land portion, the sliding surface is expanded and thus lubricity can be improved.

DESCRIPTION OF EMBODIMENTS

Hereinafter, modes for carrying out the present invention will be exemplified based on embodiments with reference to the drawings. However, unless otherwise specified, dimensions, materials, shapes, relative positions, and the like of components described in the embodiments are not intended to limit the scope of the present invention.

Embodiment 1

A sliding component according to Embodiment 1 of the present invention will be described with reference to FIGS. 1 and 2. In the following embodiment, a mechanical seal, which is an example of a sliding component, will be described as an example. However, the present invention is not limited thereto, and for example, the present invention may be used as a sliding component of a bearing that slides on a rotation shaft while sealing lubricating oil on one side in an axial direction of a cylindrical sliding surface. An outer peripheral side of the sliding component constituting the mechanical seal will be described as a sealed fluid side (a high-pressure fluid side), and an inner peripheral side will be described as a leakage side (a low-pressure fluid side, for example, an atmosphere side).

Figure 1:
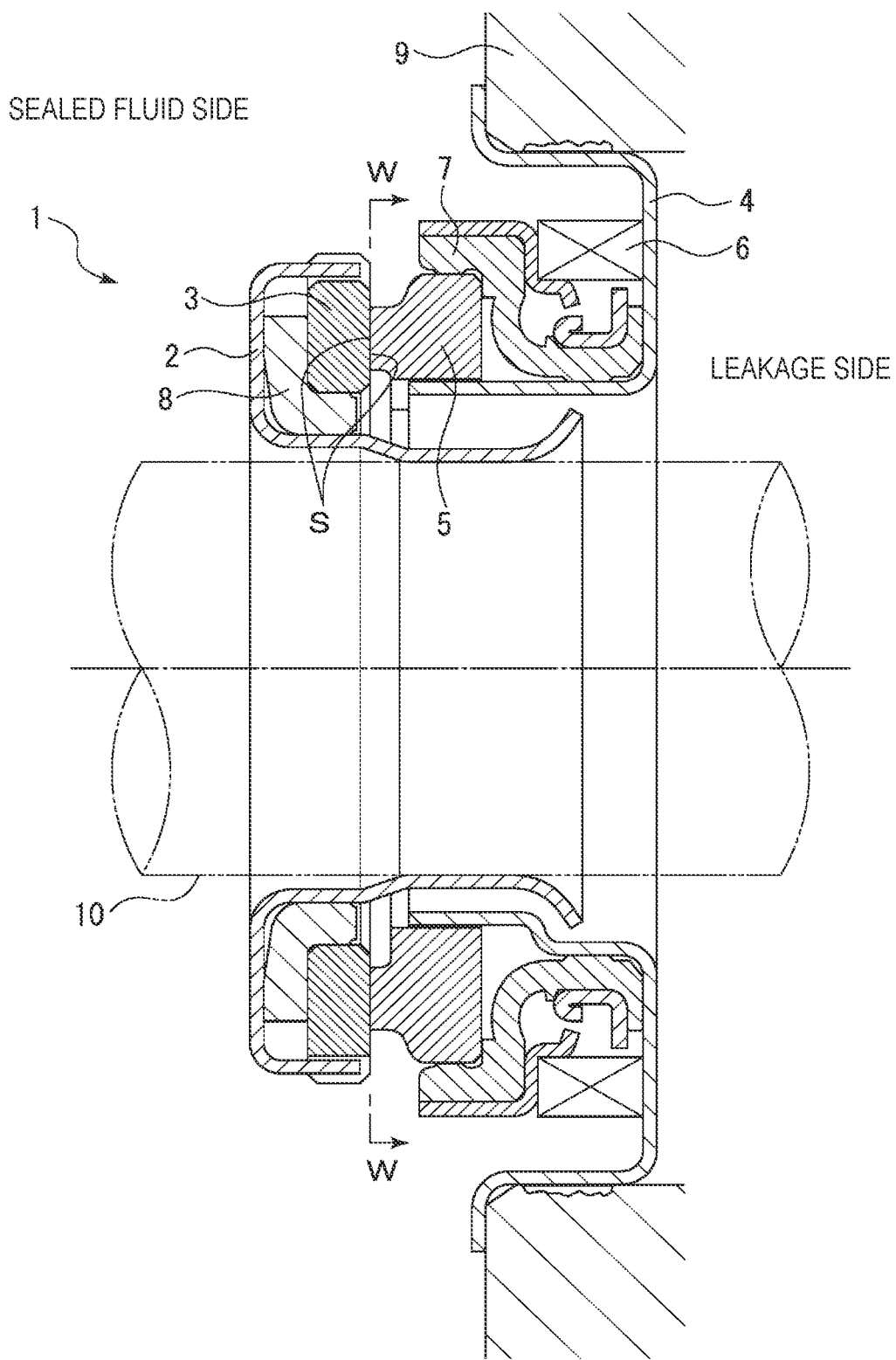
FIG. 1 is a vertical cross-sectional view showing an example in which a sliding component according to the present invention is applied to a mechanical seal.

FIG. 1 is a vertical cross-sectional view showing an example of a mechanical seal 1, which belongs to an inside type in which sealed fluid leaking from an outer periphery of a sliding surface S toward an inner peripheral direction is sealed, and includes a rotation-side cartridge and a fixed-side cartridge. The rotation-side cartridge includes a sleeve 2 fitted to a rotation shaft 10, an annular rotation-side sealing ring 3 that is one sliding component, and a packing 8 that seals space between the sleeve 2 and the rotation-side sealing ring 3. The rotation-side cartridge rotates together with the rotation shaft 10.

The fixed-side cartridge includes a housing 4 attached to a casing 9, an annular fixed-side sealing ring 5 that is another sliding component, a bellows 7 that seals space between the fixed-side sealing ring 5 and the housing 4, and a coiled wave spring 6 that urges the fixed-side sealing ring 5 toward the rotation-side sealing ring 3 via the bellows 7. The housing is fixed to the casing 9 in a rotation direction and an axial direction.

In the mechanical seal 1 having the above configuration, the sliding surface S of the rotation-side sealing ring 3 and the sliding surface S of the fixed-side sealing ring 5 slide relative to each other so as to prevent the sealed fluid from flowing out from the outer peripheral side to the inner peripheral side. Although FIG. 1 shows a case where a width of the sliding surface of the rotation-side sealing ring 3 is wider than a width of the sliding surface of the fixed-side sealing ring 5, the present invention is not limited thereto, and it is needless to say that the present invention may also be applied in an opposite case.

Materials of the rotation-side sealing ring 3 and the fixed-side sealing ring 5 are selected from silicon carbide (SiC) that has good wear resistance, carbon that has good self-lubricating performance, and the like. For example, both of the rotation-side sealing ring 3 and the fixed-side sealing ring 5 may be made of SiC, or the rotation-side sealing ring 3 may be made of SiC while the fixed-side sealing ring 5 is made of carbon.

As shown in FIG. 1, the sliding surface S of the fixed-side sealing ring 5 is partitioned into a predetermined number (six in the example of FIG. 1) of regions 11 by land portions R having no dimple, defining each of the regions 11, and provided from the sealed fluid side to the leakage side. Dimple groups 14 are arranged in the respective regions. Each dimple group 14 is formed by arranging a plurality of dimples 12. In addition, an axis CL is a radial axis that divides each region 11 symmetrically in a left-right direction.

In the present invention, each dimple 12 is a recess that includes an opening portion surrounded by the flat sliding surface S and a bottom portion that is recessed relative to the sliding surface S. An opening portion 12a of the dimple 12 has a shape having a long axis L and a short axis K orthogonal to each other. In addition, the dimples 12 are spaced apart from each other with the land portions R interposed therebetween. In the present invention, the long axis L is an imaginary straight line that passes through a centroid G of the shape of the opening portion 12a and connects maximum width portions of the opening portion 12a. In addition, the short axis K is an imaginary straight line that passes through the centroid G and is orthogonal to the long axis L to connect the opening portion. In the present embodiment, as an example, the opening portion of the dimple 12 is an ellipse having the long axis L and the short axis K orthogonal to each other. However, the shape is not limited to the ellipse, and may also be an oval shape, a rhombus shape, a polygonal shape, or any shape formed by closed curves 91, 92, 93, or 94 as shown in FIGS. 8A to 8D, as long as the shape has the long axis and the short axis orthogonal to each other.

Figure 2:
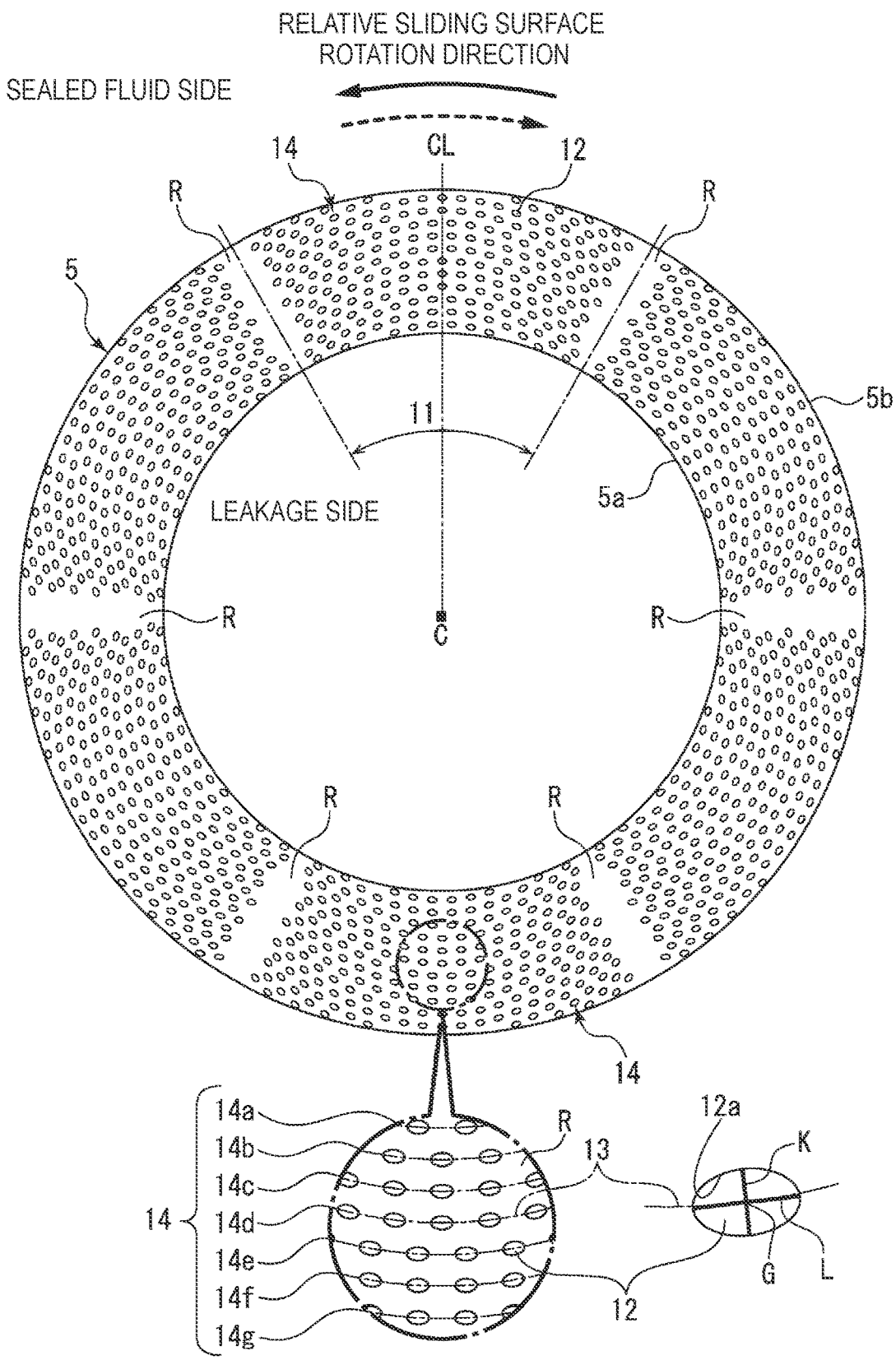
FIG. 2 is taken along line W-W of FIG. 1, which shows an example of a sliding surface of a sliding component according to Embodiment 1 of the present invention.

As shown in FIG. 2, the dimple group 14 is formed by arranging a predetermined number of sub dimple groups 14a, 14b, 14c, 14d, 14e, 14f, 14g, and so on with the land portions R interposed therebetween in a. radial direction. In addition, the sub dimple groups 14a, 14b, 14c, 14d, 14e, 14f, 14g, and so on are arranged so that the long axes L of the dimples 12 are aligned along corresponding one of imaginary curves 13 having a curvature different from a curvature of a circumference of the sliding surface S. That is, each sub dimple group has a shape in which the long axes L of the dimples 12 are aligned so as to be in contact with the imaginary curve 13. The curve 13 is a curve that is convex toward the sealed fluid side, and is formed of an arc, a parabola, a sine wave, a cycloid curve, or the like that has the curvature different from the curvature of the circumference of the sliding surface S. In addition, in the sub dimple groups 14a, 14b, 14c, 14d, 14e, 14f, 14g, and so on, the dimples 12 arranged in the vicinity of the axis CL are arranged to be closest to the sealed fluid side, and the dimples 12 arranged at both ends of the region 11 are arranged to be closest to the leakage side. In addition, the dimples 12 arranged at the both ends of each of the sub dimple groups 14a, 14b, 14c, 14d, 14e, 14f, 14g, and so on may be arranged to be in contact with a leakage-side peripheral edge 5a or to be opened toward the leakage-side peripheral edge 5a. Further, the sub dimple groups 14a, 14b, 14c, 14d, 14e, 14f, 14g, and so on may be configured such that the dimples 12 are arranged symmetrically relative to the axis CL. Hereinafter, in the present invention, the circumference of the sliding surface S indicates a locus of points at an equal distance from a center C of the sliding surface S.

Although the long axes L of the dimples 12 are arranged close to each other and aligned such that the long axes L of the dimples 12 constituting the sub dimple group are in contact with the imaginary curve 13 in Embodiment 1, the long axes L of the dimples 12 may also be arranged to be inclined at a predetermined angle relative to the imaginary curve 13. In addition, for the sake of explanation, reference numerals of the sub dimple groups 14a, 14b, 14c, 14d, 14e, 14f, and 14g are shown only in a surrounding portion in FIG. 2. The number of sub dimple groups arranged in each region 11 is determined based on design conditions and the like.

When the rotation-side sealing ring 3 of the mechanical seal 1 configured as described above rotates in a counterclockwise direction as shown in FIG. 2, fluid between the sliding surfaces S and fluid in each dimple 12 are moved following a moving direction of the rotation-side sealing ring 3 due to viscosity of the fluid. Since a flow path of the fluid flowing into the dimple 12 rapidly expands, negative pressure is generated on an upstream side of the dimple 12, and thus cavitation occurs. However, since a magnitude of the negative pressure in the cavitation is limited by a value of fluid vapor pressure, the negative pressure does not become large. In addition, on a downstream side of the dimple 12, positive pressure is generated by a wedge effect (dynamic pressure effect) due to rapid contraction of a flow path. Due to the negative pressure generated on the upstream side of the dimple 12, the dimple 12 exhibits a suction effect of suctioning surrounding fluid. On the other hand, since the positive pressure generated on the downstream side of the dimple 12 is larger than the negative pressure in the cavitation, the entire dimple 12 becomes positive pressure. Due to the positive pressure generated by the plurality of dimples 12 arranged in the sliding surface S, space between the sliding surfaces S is expanded, and thus the fluid flows onto the sliding surface S to exert a lubricating function.

When the dimples 12 are arranged from the leakage-side peripheral edge 5a, to a sealed-fluid-side peripheral edge 5b of the sliding surface S, the dimple group 14 exhibits a pumping effect of suctioning the fluid onto the sliding surface from the leakage side, and thus a sealing effect is improved. In addition, since high-pressure fluid is suctioned from the sealed fluid side to supply the fluid pressurized by the dynamic pressure effect of the dimples 12 to the sliding surface, a fluid lubricating effect can be improved. In particular, when the dimples 12 are arranged to form the shape of the curve 13 that is convex toward the sealed fluid side as in the sub dimple groups 14a, 14b, and so on in FIG. 2, the sealing effect of the dimple group 14 is improved as compared with a dimple group in which dimples are arranged concentrically in a circumferential direction of the sliding surface S.

In addition, since each dimple 12 includes the elliptical opening portion 12a that has the long axis and the short axis orthogonal to each other, the suction effect and the dynamic pressure effect of the dimple 12 become different depending on inclination of the long axis L. When the long axis L of the dimple 12 is arranged in a direction parallel to a sliding direction of the sliding surface S, a fluid holding function of the dimple 12 is improved. When the long axis L of the dimple 12 is inclined by about 45° relative to the sliding direction, the suction effect is improved. In addition, when the long axis L of the dimple 12 is arranged in a direction orthogonal to the sliding direction, the dynamic pressure effect is improved. In this way, even when the dimple 12 has the same elliptical shape, the suction effect and the dynamic pressure effect may be increased or decreased by changing the inclination of the long axis L of the dimple 12.

In addition, since the dimples 12 are arranged along the curve 13 in the sub dimple groups 14a, 14b, and so on, an angle of the long axis L of each dimple 12 gradually changes along the curve 13. As a result, since a direction of the long axis L of each dimple 12 gradually changes along the curve 13, the sub dimple groups 14a, 14b, and so on are constituted by dimples 12 having different suction effects and dynamic pressure effects. Even when the mechanical seal 1 is used in a wide rotation speed range, since the dimples 12 suitable for each rotation speed exhibit favorable suction effect and dynamic pressure effect, the dimple group 14 as a whole exhibits favorable sealing performance and lubricating function.

Further, the sub dimple groups 14a, 14b, and so on are arranged substantially symmetrically relative to the axis CL along the curve 13 so as to be convex toward the sealed fluid side, and therefore, the sub dimple groups 14a, 14b, and so on exhibit favorable sealing performance and lubricating function not only during forward rotation but also during reverse rotation.

As described above, the sliding component of the present invention has the following effects.

1. The dimples 12 constituting the dimple group 14 have negative pressure on the upstream side thereof so as to exhibit a fluid suctioning effect, and exhibit a lubricating function since fluid pressurized by a wedge effect on the downstream side is supplied to the sliding surface.

2. When the dimples 12 are arranged from the leakage-side peripheral edge 5a to the sealed-fluid-side peripheral edge 5b of the sliding surface S, the dimple group 14 exhibits a pumping effect of suctioning the fluid onto the sliding surface from the leakage side, and thus a sealing effect can be improved. In addition, since high-pressure fluid is suctioned from the sealed fluid side to supply the fluid pressurized by the dynamic pressure effect of the dimples 12 to the sliding surface, a fluid lubricating effect can be improved.

3. When the dimples 12 are arranged to form the shape of the curve 13 that is convex toward the sealed fluid side as in the sub dimple groups 14a, 14b, and so on in FIG. 2, the sealing effect of the dimple group 14 can be improved as compared with a dimple group in which dimples are arranged concentrically in a circumferential direction of the sliding surface S.

4. Since each dimple 12 includes the elliptical opening portion 12a that has the long axis and the short axis orthogonal to each other, strength of the suction effect and the dynamic pressure effect of the dimple 12 can be changed by changing the inclination of the long axis L. As a result, even when the dimple 12 has the same elliptical shape, the suction effect and the dynamic pressure effect can be improved by changing the inclination of the long axis L of the dimple 12.

5. Since the dimples 12 are arranged along the curve 13 in the sub dimple groups 14a, 14b, and so on, the angle of the long axis L of each dimple 12 gradually changes along the curve 13. As a result, since the direction of the long axis L of each dimple 12 gradually changes along the curve 13, the sub dimple groups 14a, 14b, and so on are constituted by dimples 12 having different suction effects and dynamic pressure effects. Even when the mechanical seal 1 is used in a wide rotation speed range, since the dimples 12 suitable for each rotation speed exhibit favorable suction effect and dynamic pressure effect, the dimple group 14 as a whole exhibits favorable sealing performance and lubricating function, 6. The sub dimple group 14 is arranged substantially symmetrically relative to the axis CL so as to form the curve 13 that is convex toward the sealed fluid side, and therefore, the sub dimple group 14 exhibits favorable suction effect and dynamic pressure effect not only during forward rotation but also during reverse rotation.

Embodiment 2

Figure 3:
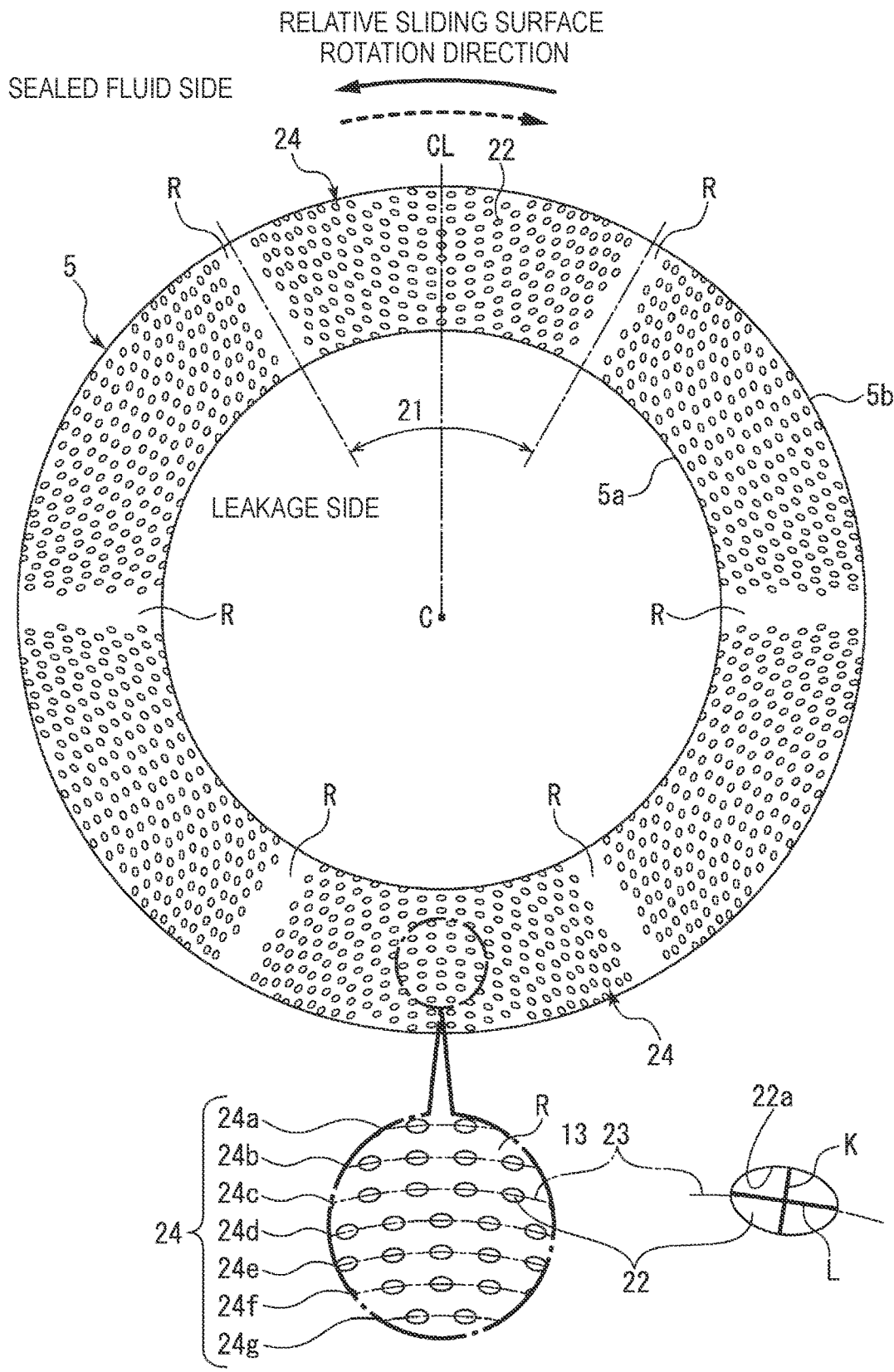
FIG. 3 is taken along line W-W of FIG. 1, which shows an example of a sliding surface of a sliding component according to Embodiment 2 of the present invention.

A sliding component according to Embodiment 2 of the present invention will be described. FIG. 3 shows the sliding surface S of the sliding component according to Embodiment 2 in which sub dimple groups 24a, 24b, and so on are arranged along a curve 23 that is convex toward the leakage side, which is different from Embodiment 1. Other configurations are the same as those of Embodiment 1. Hereinafter, the same members and configurations as those of Embodiment 1 will be denoted by the same reference numerals, and redundant description thereof will be omitted.

As shown in FIG. 3, the sliding surface S of the fixed-side sealing ring 5 is partitioned into a predetermined number (six in the example of FIG. 3) of regions 21 by the land portions R provided from the sealed fluid side to the leakage side. Dimple groups 24 are arranged in the respective regions. Each dimple group 24 is formed by arranging a plurality of dimples 22. In addition, the axis CL is a radial axis that divides each region 21 symmetrically in the left-right direction.

As shown in FIG. 3, the dimple group 24 is formed by arranging a predetermined number of sub dimple groups 24a, 24b, 24c, 24d, 24e, 24f, 24g, and so on with the land portions R interposed therebetween in the radial direction. The sub dimple groups 24a, 24b, 24c, 24d, 24e, 24f, 24g, and so on are arranged such that the long axes L of the dimples 22 are aligned to form the imaginary curve 23 having a curvature different from the curvature of the circumference of the sliding surface S. That is, each sub dimple group has a shape in which the long axes L of the dimples 22 are aligned so as to be in contact with the imaginary curve 23. The curve 23 is a curve that is convex toward the leakage side, and is formed of an arc, a parabola, a sine wave, a cycloid curve, or the like that has the curvature different from the curvature of the circumference of the sliding surface S. In addition, in the sub dimple groups 24a, 24b, 24c, 24d, 24e, 24f, 24g, and so on, the dimples 22 arranged in the vicinity of the axis CL are arranged closest to the leakage side, and the dimples 22 arranged at both ends are arranged closest to the sealed fluid side. In addition, the dimples 22 arranged at both ends of each of the sub dimple groups 24a, 24b, 24c, 24d, 24e, 24f, 24g, and so on may be arranged to be in contact with the sealed-fluid-side peripheral edge 5b or to be opened toward the sealed-fluid-side peripheral edge 5b. Further, the sub dimple groups 24a, 24b, 24c, 24d, 24e, 24f, 24g, and so on may be configured such that the dimples 22 are arranged symmetrically relative to the axis CL. For the sake of explanation, reference numerals of the sub dimple groups 24a, 24b, 24c, 24d, 24e, 24f, and 24g are shown only in a surrounding portion in FIG. 3. The number of sub dimple groups arranged in each region 21 is determined base on design conditions and the like.

When the dimples 22 are arranged close to each other and along the curve 23 as in the sub dimple groups 24a, 24b, and so on, suction and discharge are continuously repeated between the adjacent dimples 22. Therefore, when the dimples 22 are arranged from the leakage-side peripheral edge 5a to the sealed-fluid-side peripheral edge 5b of the sliding surface S, the dimple group 24 exhibits a pumping effect of suctioning the fluid onto the sliding surface from the leakage side, and thus leakage can be reduced. In addition, since high-pressure fluid is suctioned from the sealed fluid side and fluid pressurized by a dynamic pressure effect of each dimple 22 is supplied to the sliding surface, a fluid lubricating effect can be improved. In particular, as shown in FIG. 3, when the dimples 22 are arranged along the curve 23 that is convex toward the leakage side as in the sub dimple groups 24a, 24b, and so on, the fluid lubricating effect of the dimple group 24 can be stronger than a sealing effect thereof.

In addition, since the dimples 22 are arranged along the curve 23 in the sub dimple groups 24a, 24b, and so on, the angle of the long axis L of each dimple 22 gradually changes along the curve 23, and thus a suction effect and the dynamic pressure effect of each dimple also gradually change along the curve 23. That is, since the dimples 22 having different suction effects and dynamic pressure effects are arranged in the sub dimple groups 24a, 24b, and so on, even when used in a wide rotation speed range, there are dimples 22 exhibiting favorable suction effect and dynamic pressure effect at each rotation speed. By arranging the dimple group 24 in which the plurality of sub dimple groups 24a, 24b, and so on are arranged in the radial direction in each region 21 of the sliding surface, the dimple group 24 as a whole exhibits a lubricating function even when used in a wide rotation speed range.

Further, the sub dimple groups 24a, 24b, and so on are arranged substantially symmetrically relative to the axis CL so as to form the curve 23 that is convex toward the leakage side, and therefore, the sub dimple groups 24a, 24b, and so on exhibit a favorable lubricating function not only during forward rotation but also during reverse rotation.

As described above, the sliding component of Embodiment 2 has the following effects.

1. The dimples 22 constituting the dimple group 24 have negative pressure on an upstream side thereof so as to exhibit a fluid suctioning function, and exhibit a lubricating function by discharging fluid pressurized by a wedge effect on a downstream side.

2. When the dimples 22 are arranged from the leakage-side peripheral edge 5a to the sealed-fluid-side peripheral edge 5b of the sliding surface S, the dimple group 24 exhibits a pumping effect of suctioning the fluid onto the sliding surface from the leakage side, and thus leakage can be reduced. In addition, since high-pressure fluid is suctioned from the sealed fluid side and fluid pressurized by the dynamic pressure effect of each dimple 22 is supplied to the sliding surface, a fluid lubricating effect can be improved.

3. When the dimples 22 are arranged to form the shape of the curve 23 that is convex toward the leakage side as in the sub dimple groups 24a, 24b, and so on in FIG. 3, the fluid lubricating effect of the dimple group 24 can be improved as compared with a dimple group in which dimples are arranged concentrically in the circumferential direction of the sliding surface S.

4. Since each dimple 22 includes an elliptical opening portion 22a that has the long axis and the short axis orthogonal to each other, strength of the suction effect and the dynamic pressure effect of the dimple 22 can be changed by changing the inclination of the long axis L. As a result, even when the dimple 22 has the same elliptical shape, the suction effect and the dynamic pressure effect can be improved by changing the inclination of the long axis L of the dimple 22.

5. Since the dimples 22 are arranged along the curve 23 in the sub dimple groups 24a, 24b, and so on, the angle of the long axis L of each dimple 22 gradually changes along the curve 23, and thus the suction effect and the dynamic pressure effect of each dimple also gradually change along the curve 23. That is, since the dimples 22 having different suction effects and dynamic pressure effects are arranged in the sub dimple groups 24a, 24b, and so on, even when used in a wide rotation speed range, there are dimples 22 exhibiting favorable suction effect and dynamic pressure effect at each rotation speed. By arranging the dimple group 24 in which the plurality of sub dimple groups 24a, 24b, and so on are arranged in the radial direction in each region 21 of the sliding surface, the dimple group 24 as a whole exhibits a lubricating function even when used in a wide rotation speed range.

6. The sub dimple groups 24a, 24b, and so on are arranged substantially symmetrically relative to the axis CL so as to form the curve 23 that is convex toward the leakage side, and therefore, the sub dimple groups 24a, 24b, and so on exhibit a favorable lubricating function not only during forward rotation but also during reverse rotation.

Embodiment 3

Figure 4:
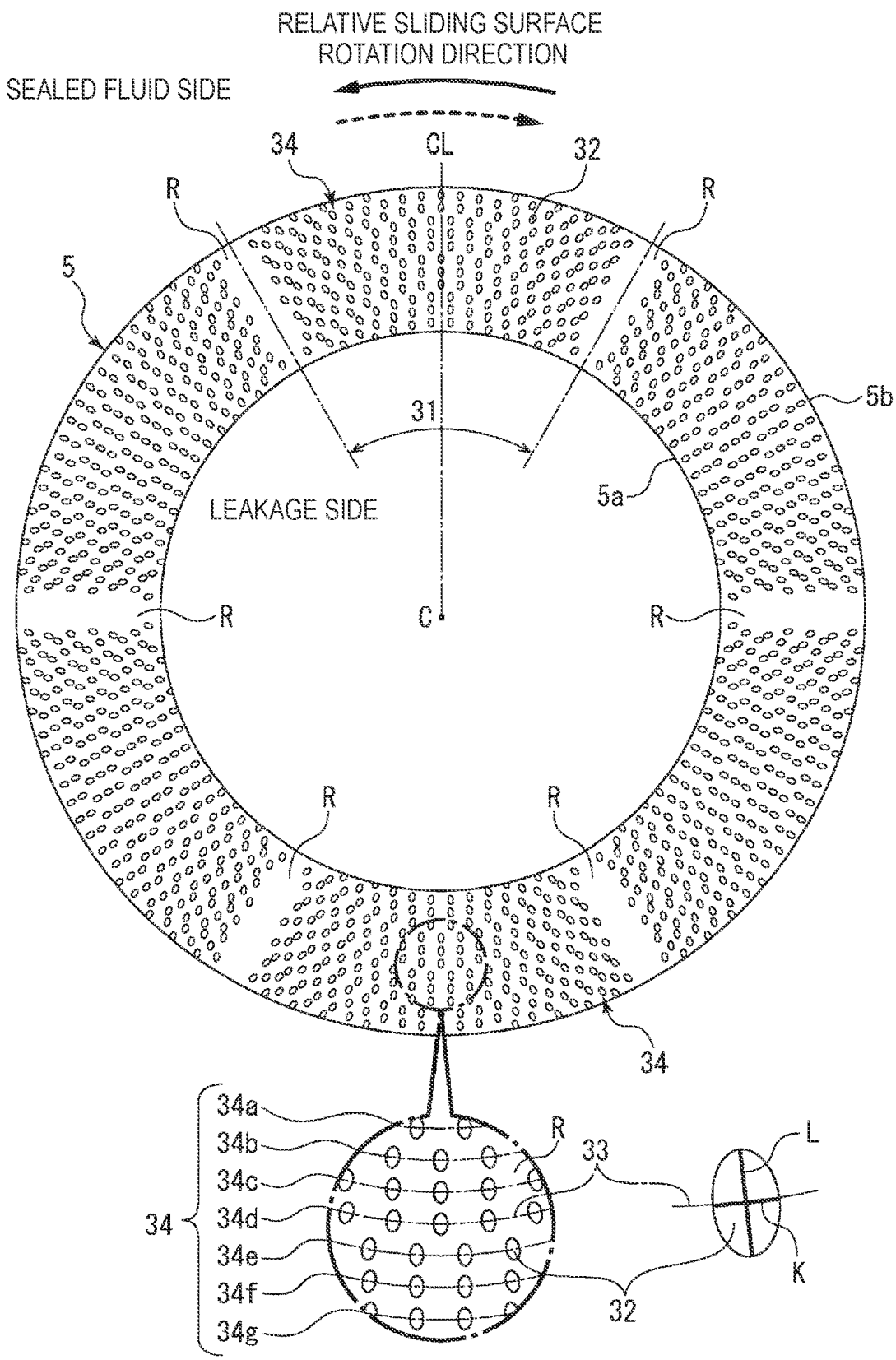
FIG. 4 is taken along line W-W of FIG. 1, which shows an example of a sliding surface of a sliding component according to Embodiment 3 of the present invention.

A sliding component according to Embodiment 3 of the present invention will be described. FIG. 4 shows the sliding surface S of a sliding component according to Embodiment 3 in which a dimple group 34 is arranged such that the short axes K of adjacent dimples 32 are arranged close to each other and aligned to form a curve 33 that is convex toward the sealed fluid side, which is different from Embodiment 1. Other configurations are the same as those of Embodiment 1. Hereinafter, the same members and configurations as those of Embodiment 1 will be denoted by the same reference numerals, and redundant description thereof will be omitted.

As shown in FIG. 4, the sliding surface S of the fixed-side sealing ring 5 is partitioned into a predetermined number (six in the example of FIG. 4) of regions 31 by the land portions R provided from the sealed fluid side to the leakage side. The dimple groups 34 are arranged in the respective regions. Each dimple group 34 is formed by arranging a plurality of the dimples 32. In addition, the axis CL is a radial axis that divides each region 31 symmetrically in the left-right direction.

As shown in FIG. 4, the dimple group 34 is formed by arranging a predetermined number of sub dimple groups 34a, 34b, 34c, 34d, 34e, 34f, 34g, and so on with the land portions R interposed therebetween in the radial direction. The sub dimple groups 34a, 34b, 34c, 34d, 34e, 34f, 34g, and so on are arranged such that the short axes K of the dimples 32 are aligned to form the imaginary curve 33 having a curvature different from the curvature of the circumference of the sliding surface S. That is, each sub dimple group has a shape in which the short axes K of the dimples 32 are aligned so as to be in contact with the imaginary curve 33. The curve 33 is a curve that is convex toward the sealed fluid side, and is formed of an arc, a parabola, a sine wave, a cycloid curve, or the like that has the curvature different from the curvature of the circumference of the sliding surface S. In addition, in the sub dimple groups 34a, 34b, 34c, 34d, 34e, 34f, 34g, and so on, the dimples 32 arranged in the vicinity of the axis CL are arranged closest to the sealed fluid side, and the dimples 32 arranged at both ends are arranged closest to the leakage side. In addition, the dimples 32 arranged at both ends of each of the sub dimple groups 34a, 34b, 34c, 34d, 34e, 34f, 34g, and so on may be arranged to be in contact with the leakage-side peripheral edge 5a or to be opened toward the leakage-side peripheral edge 5a. Further, the sub dimple groups 34a, 34b, 34c, 34d, 34e, 34f, 34g, and so on may be configured such that the dimples 32 are arranged symmetrically relative to the axis CL. Here, the curve 33 is an imaginary curve that is in contact with the short axis K of each dimple 32. For the sake of explanation, reference numerals of the sub dimple groups 34a, 34b, 34c, 34d, 34e, 34f, and 34g are shown only in a surrounding portion in FIG. 4. The number of sub dimple groups arranged in each region 31 is determined base on design conditions and the like.

In Embodiment 3, a dynamic pressure effect of the dimple 32 can be better than a sealing effect thereof by arranging the long axes L of the dimples 32 in the radial direction. As a result, a lubricating effect of the sliding surface S as a whole can be improved, and thus sliding torque can be reduced.

In addition, when the dimples 32 are arranged to form a shape of the curve 33 that is convex toward the sealed fluid side as in the sub dimple groups 34a, 34b, and so on in FIG. 4, a sealing effect of the dimple group 34 can be improved as compared with a dimple group in which dimples are arranged concentrically in the circumferential direction of the sliding surface S.

In addition, since the dimples 32 are arranged along the curve 33 in the sub dimple groups 34a, 34b, and so on, an angle of the short axis K of each dimple 32 gradually changes along the curve 33. As a result, a suction effect and the dynamic pressure effect of each dimple 32 gradually change along the curve 33. That is, since the dimples 32 exhibiting different suction effects and dynamic pressure effects are arranged in the sub dimple groups 34a, 34b, and so on, even when used in a wide rotation speed range, there are dimples 32 exhibiting favorable suction effect and dynamic pressure effect at each rotation speed. By arranging the dimple group 34 in which the plurality of sub dimple groups 34a, 34b, and so on are arranged in the radial direction in each region 31 of the sliding surface, the dimple group 34 as a whole exhibits favorable sealing performance and lubricating function even when used in a wide rotation speed range.

Further, the sub dimple groups 34a, 34b, and so on are arranged substantially symmetrically relative to the axis CL so as to form the curve 33 that is convex toward the sealed fluid side, and therefore, the sub dimple groups 34a, 34b, and so on exhibit favorable sealing performance and lubricating function not only during forward rotation but also during reverse rotation.

As described above, the sliding component of Embodiment 3 has the following effects in addition to the effects of Embodiment 1.

1. The dynamic pressure effect of the dimple 32 can be better than the sealing effect thereof by arranging the long axes L of the dimples 32 in the radial direction. As a result, the lubricating effect of the sliding surface S as a whole can be improved, and thus sliding torque can be reduced.

2. When the dimples 32 are arranged to form the shape of the curve 33 that is convex toward the sealed fluid side as in the sub dimple groups 34a, 34b, and so on in FIG. 4, the sealing effect of the dimple group 34 can be improved as compared with a dimple group in which dimples are arranged concentrically in the circumferential direction of the sliding surface S.

Embodiment 4

Figure 5:
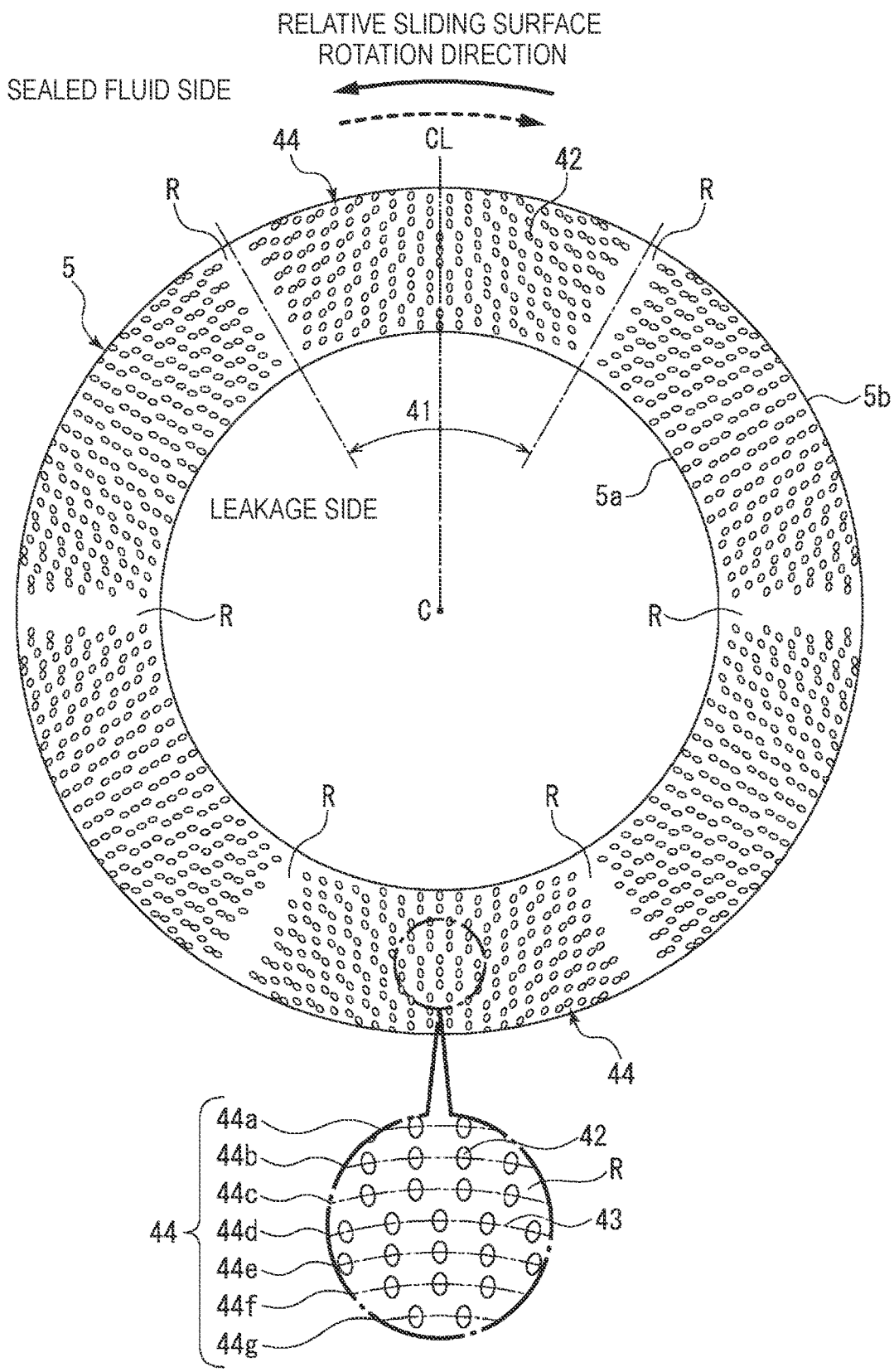
FIG. 5 is taken along line W-W of FIG. 1, which shows an example of a sliding surface of a sliding component according to Embodiment 4 of the present invention.

A sliding component according to Embodiment 4 of the present invention will be described. FIG. 5 shows the sliding surface S of a sliding component according to Embodiment 4 in which a dimple group 44 is arranged such that the short axes K of adjacent dimples 42 are arranged close to each other and aligned to form a curve 43 that is convex toward the leakage side, which is different from Embodiment 1. Other configurations are the same as those of Embodiment 1. Hereinafter, the same members and configurations as those of Embodiment 1 will be denoted by the same reference numerals, and redundant description thereof will be omitted.

As shown in FIG. 5, the sliding surface S of the fixed-side sealing ring 5 is partitioned into a predetermined number (six in the example of FIG. 5) of regions 41 by the land portions R provided from the sealed fluid side to the leakage side. The dimple groups 44 are arranged in the respective regions. Each dimple group 44 is formed by arranging a plurality of the dimples 42. In addition, the axis CL is a radial axis that divides each region 41 symmetrically in the left-right direction, As shown in FIG. 5, the dimple group 44 is formed by arranging a predetermined number of sub dimple groups 44a, 44b, 44c, 44d, 44e, 44f, 44g, and so on with the land portions R interposed therebetween in the radial direction. The sub dimple groups 44a, 44b, 44c, 44d, 44e, 44f, 44g, and so on are arranged such that the short axes K of the dimples 42 are aligned to form the imaginary curve 43 having a curvature different from the curvature of the circumference of the sliding surface S. That is, each sub dimple group has a shape in which the short axes K of the dimples 42 are aligned so as to be in contact with the imaginary curve 43. The curve 43 is a curve that is convex toward the leakage side, and is formed of an arc, a parabola, a sine wave, a cycloid curve, or the like that has the curvature different from the curvature of the circumference of the sliding surface S. In addition, in the sub dimple groups 44a, 44b, 44c, 44d, 44e, 44f, 44g, and so on, the dimples 42 arranged in the vicinity of the axis CL are arranged closest to the leakage side, and the dimples 42 arranged at both ends are arranged closest to the sealed fluid side. In addition, the dimples 42 arranged at both ends of each of the sub dimple groups 44a, 44b, 44c, 44d, 44e, 44f, 44g, and so on may be arranged to be in contact with the sealed-fluid-side peripheral edge 5b or to be opened toward the sealed-fluid-side peripheral edge 5b. Further, the sub dimple groups 44a, 44b, 44c, 44d, 44e, 44f, 44g, and so on may be configured such that the dimples 42 are arranged symmetrically relative to the axis CL. For the sake of explanation, reference numerals of the sub dimple groups 44a, 44b, 44c, 44d, 44e, 44f, and 44g are shown only in a surrounding portion in FIG. 5. The number of sub dimple groups arranged in each region 41 is determined base on design conditions and the like.

A dynamic pressure effect of the dimple 42 can be better than a sealing effect thereof by arranging the long axes L of the dimples 42 in the radial direction. As a result, the lubricating effect of the sliding surface S as a whole can be improved, and thus sliding torque can be reduced.

When the dimples 42 are arranged to form a shape of the curve 43 that is convex toward the leakage side as in the sub dimple groups 44a, 44b, and so on in FIG. 5, a fluid lubricating effect of the dimple group 44 can be improved as compared with a dimple group in which dimples are arranged concentrically in the circumferential direction of the sliding surface S.

In addition, since the dimples 42 are arranged along the curve 43 in the sub dimple groups 44a, 44b, and so on, the angle of the long axis L of each dimple 42 gradually changes along the curve 43. As a result, a suction effect and the dynamic pressure effect of each dimple 42 gradually change along the curve 43. That is, since the dimples 42 exhibiting different suction effects and dynamic pressure effects are arranged in the sub dimple groups 44a, 44b, and so on, even when used in a wide rotation speed range, there are dimples 42 exhibiting favorable suction effect and dynamic pressure effect at each rotation speed. By arranging the dimple group 44 in which the plurality of sub dimple groups 44a, 44b, and so on are arranged in the radial direction in each region 41 of the sliding surface, the dimple group 44 as a whole exhibits favorable sealing performance and lubricating function even when used in a wide rotation speed range.

Further, the sub dimple groups 44a, 44b, and so on are arranged substantially symmetrically relative to the axis CL so as to form the curve 43 that is convex toward the leakage side, and therefore, the sub dimple groups 44a, 44b, and so on exhibit favorable sealing performance and lubricating function not only during forward rotation but also during reverse rotation.

As described above, the sliding component of Embodiment 4 has the following effects in addition to the effects of Embodiment 2.

1. The dynamic pressure effect of the dimple 42 can be better than the sealing effect thereof by arranging the long axes L of the dimples 42 in the radial direction. As a result, the lubricating effect of the sliding surface S as a whole can be improved, and thus sliding torque can be reduced.

2. When the dimples 42 are arranged to form the shape of the curve 43 that is convex toward the leakage side as in the sub dimple groups 44a, 44b, and so on in FIG. 5, the fluid lubricating effect of the dimple group 44 can be improved as compared with a dimple group in which dimples are arranged concentrically in the circumferential direction of the sliding surface S.

Embodiment 5

Figure 6:
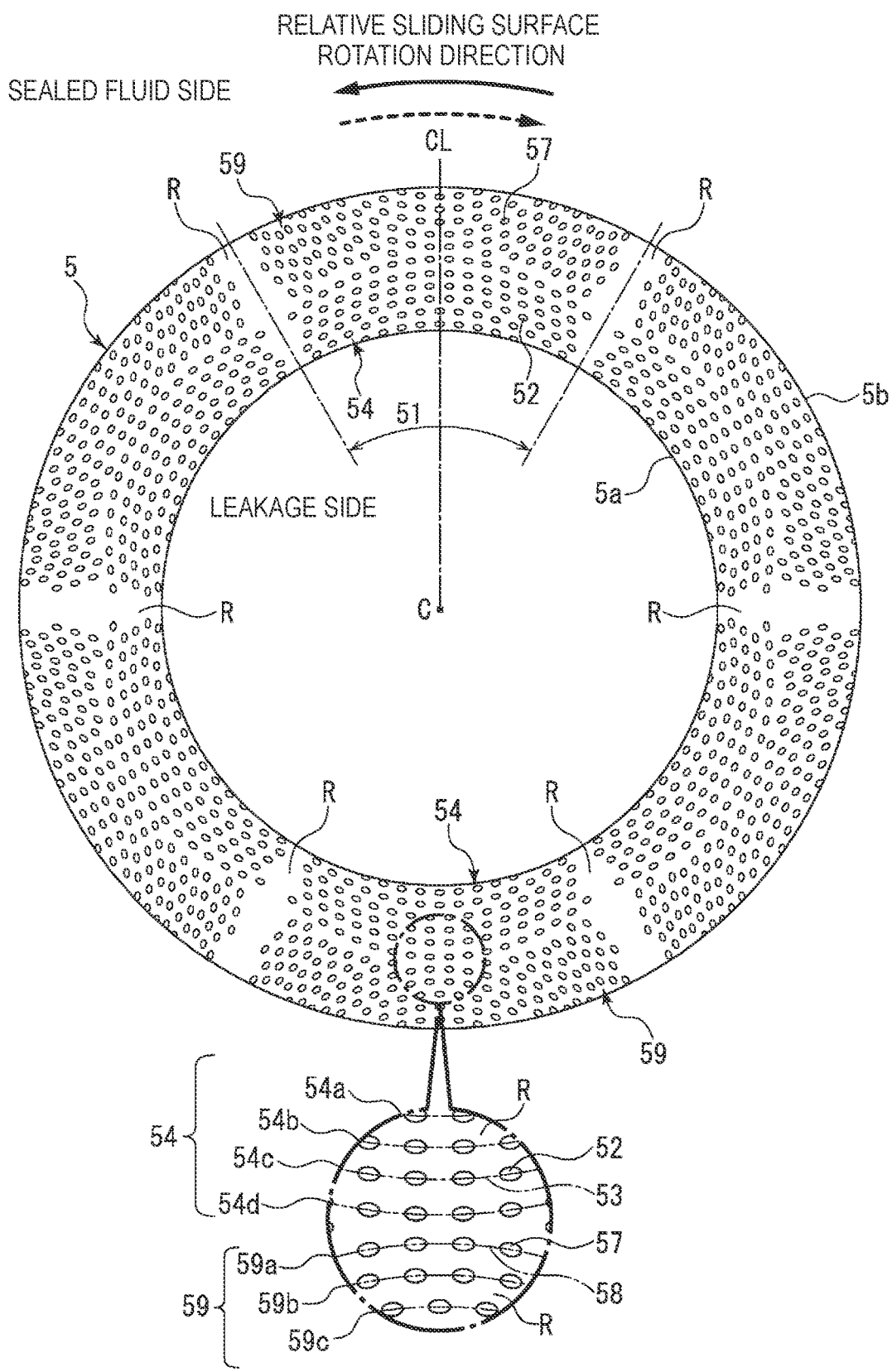
FIG. 6 is taken along line W-W of FIG. 1, which shows an example of a sliding surface of a sliding component according to Embodiment 5 of the present invention.

A sliding component according to Embodiment 5 of the present invention will be described. FIG. 6 shows the sliding surface S of a sliding component according to Embodiment 5 in which a dimple group 54 arranged to form a curve 53 that is convex toward the sealed fluid side on the leakage side and a dimple group 59 arranged to form a curve 58 that is convex toward the leakage side on the sealed fluid side are provided, which is different from Embodiment 1. Other configurations are the same as those of Embodiment 1. Hereinafter, the same members and configurations as those of Embodiment 1 will be denoted by the same reference numerals, and redundant description thereof will be omitted.

As shown in FIG. 6, the sliding surface S of the fixed-side sealing ring 5 is partitioned into a predetermined number (six in the example of FIG. 6) of regions 51 by the land portions R provided from the sealed fluid side to the leakage side. The dimple groups 54 and 59 are arranged in the respective regions. Each dimple group 54 is formed by arranging a plurality of dimples 52, and each dimple group 59 is formed by arranging a plurality of dimples 57. In addition, the axis CL is a radial axis that divides each region 51 symmetrically in the left-right direction.

The dimple group 54 is arranged on the leakage side of the sliding surface S. The dimple group 54 is formed by arranging a predetermined number of sub dimple groups 54a, 54b, 54c, 54d, and so on with the land portions R interposed therebetween in the radial direction. In addition, the sub dimple groups 54a, 54b, 54c, 54d, and so on are arranged such that the long axes L of the dimples 52 are aligned to form the imaginary curve 53 having a curvature different from the curvature of the circumference of the sliding surface S. That is, each sub dimple group has a shape in which the long axes L of the dimples 52 are aligned so as to be in contact with the imaginary curve 53. The curve 53 is a curve that is convex toward the sealed fluid side, and is formed of an arc, a parabola, a sine wave, a cycloid curve, or the like that has the curvature different from the curvature of the circumference of the sliding surface S. In addition, in the sub dimple groups 54a, 54b, 54c, 54d, and so on, the dimples 52 arranged in the vicinity of the axis CL are arranged closest to the sealed fluid side, and the dimples 52 arranged at both ends far from the axis CL are arranged closest to the leakage side. In addition, the dimples 52 arranged at both ends of each of the sub dimple groups 54a, 54b, 54c, 54d, and so on may be arranged to be in contact with the leakage-side peripheral edge 5a or to be opened toward the leakage-side peripheral edge 5a. Further, the sub dimple groups 54a, 54b, 54c, 54d, and so on may be configured such that the dimples 52 are arranged symmetrically relative to the axis CL. For the sake of explanation, reference numerals of the sub dimple groups 54a, 54b, 54c, and 54d are shown only in a surrounding portion in FIG. 6. The number of sub dimple groups arranged in each region 51 is determined base on design conditions and the like.

The dimple group 59 is arranged on the sealed fluid side of the sliding surface S. The dimple group 59 is formed by arranging a predetermined number of sub dimple groups 59a, 59b, 59c, and so on with the land portions R interposed therebetween in the radial direction. The sub dimple groups 59a, 59b, 59c, and so on are arranged such that the long axes L of the dimples 57 are aligned to form the imaginary curve 58 having a curvature different from the curvature of the circumference of the sliding surface S. That is, each sub dimple group has a shape in which the long axes L of the dimples 57 are aligned so as to be in contact with the imaginary curve 58. The curve 58 is a curve that is convex toward the leakage side, and is formed of an arc, a parabola, a sine wave, a cycloid curve, or the like that has the curvature different from the curvature of the circumference of the sliding surface S. In addition, in the sub dimple groups 59a, 59b, 59c, and so on, the dimples 57 arranged in the vicinity of the axis CL are arranged closest to the leakage side, and the dimples 57 arranged at both ends are arranged closest to the sealed fluid side. In addition, the dimples 57 arranged at both ends of each of the sub dimple groups 59a, 59b, 59c, and so on may be arranged to be in contact with the sealed-fluid-side peripheral edge 5b or to be opened toward the sealed-fluid-side peripheral edge 5b. Further, the sub dimple groups 59a, 59b, 59c, and so on may be configured such that the dimples 57 are arranged symmetrically relative to the axis CL. For the sake of explanation, reference numerals of the sub dimple groups 59a, 59b, and 59c are shown only in a surrounding portion in FIG. 6.

The dimple group 54 that is provided on the leakage side of the sliding surface S and arranged to form the curve 53 that is convex toward the sealed fluid side exhibits better sealing performance than dimples arranged concentrically in the circumferential direction of the sliding surface S. In addition, the dimple group 59 that is provided on the sealed fluid side of the sliding surface S and arranged to form the curve 58 that is convex toward the leakage side of the sliding surface S exhibits a better lubricating effect than dimples arranged concentrically in the circumferential direction of the sliding surface S. By arranging the dimple group 54 having excellent sealing performance and the dimple group 59 having excellent lubricating performance on the sliding surface S in this manner, the mechanical seal 1 can exhibit excellent sealing performance and lubricating performance.

Since the dimple group 54 is arranged substantially symmetrically relative to the axis CL so as to form the curve 53 that is convex toward the sealed fluid side, the dimple group 54 can exhibit favorable sealing performance not only during forward rotation but also during reverse rotation. In addition, since the dimple group 59 is arranged substantially symmetrically relative to the axis CL so as to form the curve 58 that is convex toward the leakage side, the dimple group 59 exhibits a lubricating function not only during forward rotation but also during reverse rotation, and thus can exhibit favorable sealing performance and lubricating performance regardless of a rotation direction thereof.

As described above, the sliding component of Embodiment 5 has the following effects in addition to the effects of Embodiments 1 and 2.

1. The dimple group 54 that is provided on the leakage side of the sliding surface S and arranged to form the curve 53 that is convex toward the sealed fluid side exhibits better sealing performance than dimples arranged concentrically in the circumferential direction of the sliding surface S. In addition, the dimple group 59 that is provided on the sealed fluid side of the sliding surface S and arranged to form the curve 58 that is convex toward the leakage side of the sliding surface S exhibits a better lubricating effect than dimples arranged concentrically in the circumferential direction of the sliding surface S.

2. Since the dimple group 54 is arranged substantially symmetrically relative to the axis CL while the dimple group 59 is arranged substantially symmetrically relative to the axis CL, favorable sealing performance and lubricating performance can be exhibited regardless of rotation directions.

Embodiment 6

Figure 7:
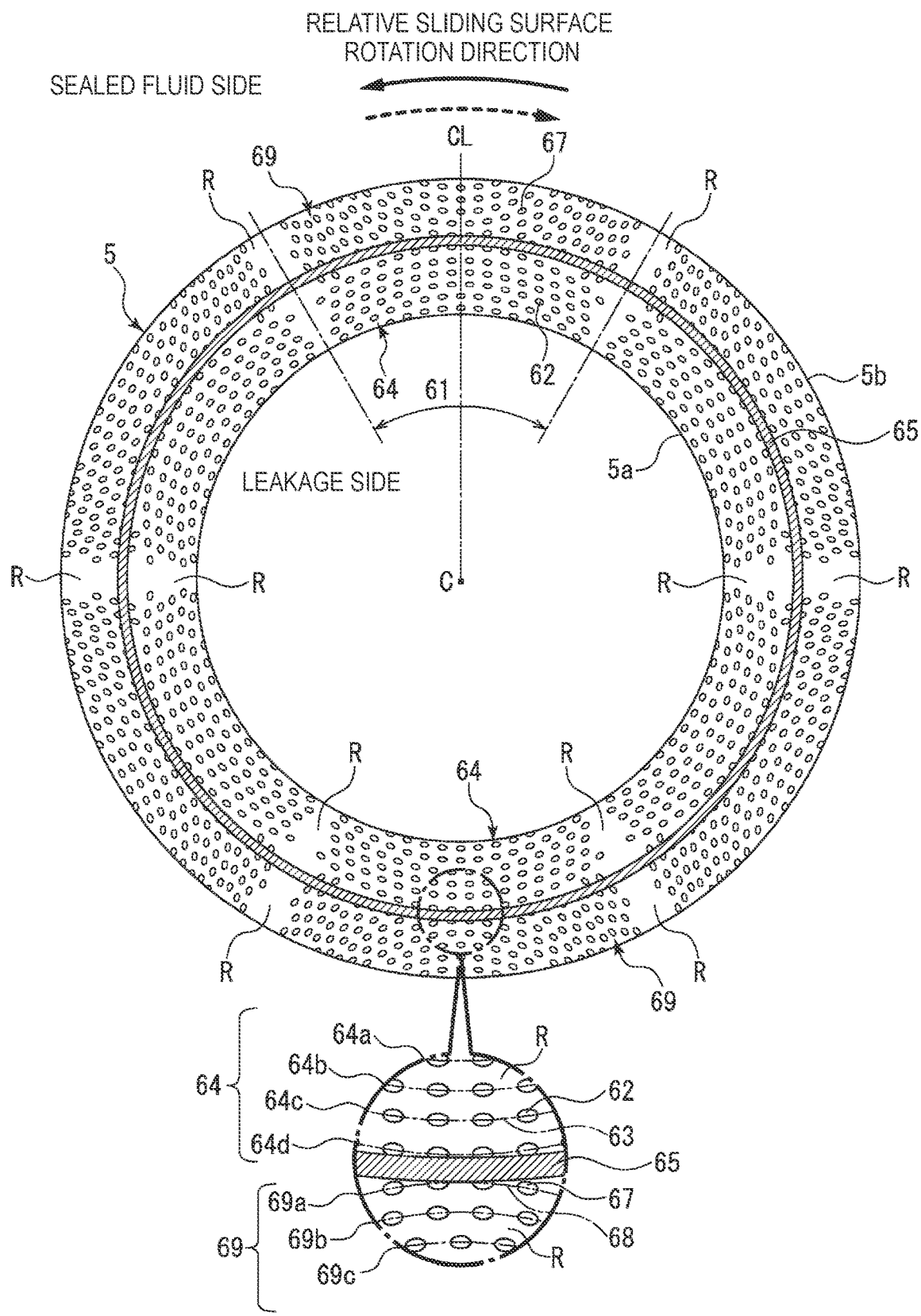
FIG. 7 is taken along line W-W of FIG. 1, which shows an example of a sliding surface of a sliding component according to Embodiment 6 of the present invention.
Figure 8A:
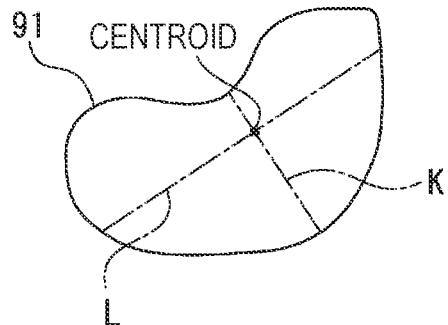
FIGS. 8A to 8D are examples of a closed curve having a short axis and a long axis.
Figure 8B:
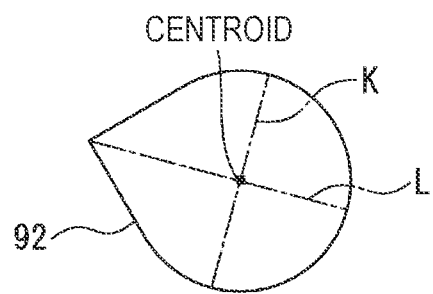
Figure 8C:
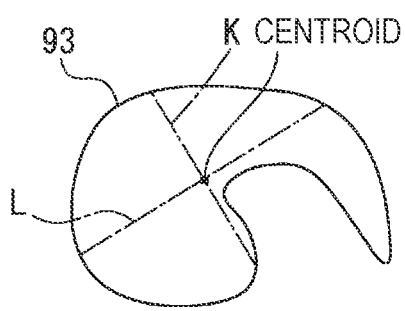
Figure 8D:
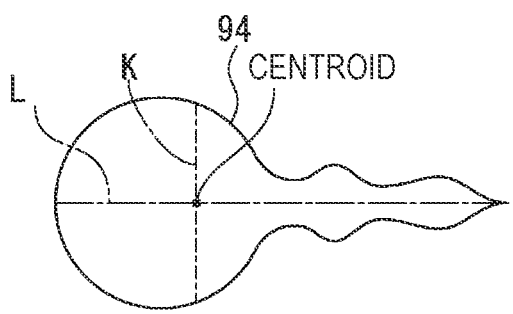

A sliding component according to Embodiment 6 of the present invention will be described. FIG. 7 shows the sliding surface S of a sliding component according to Embodiment 6 in which a groove portion is provided between a dimple group 64 arranged to form a curve 63 that is convex toward the sealed fluid side on the leakage side and a dimple group 69 arranged to form a curve 68 that is convex toward the leakage side on the sealed fluid side, which is different from Embodiment 5. Other configurations are the same as those of Embodiment 5. Hereinafter, the same members and configurations as those of Embodiment 5 will be denoted by the same reference numerals, and redundant description thereof will be omitted.

As shown in FIG. 7, the sliding surface S of the fixed-side sealing ring 5 is partitioned into a predetermined number (six in the example of FIG. 7) of regions 61 by the land portions R provided from the sealed fluid side to the leakage side. The dimple groups 64 and 69 are arranged in the respective regions. Each dimple group 64 is formed by arranging a plurality of dimples 62, and each dimple group 69 is formed by arranging a plurality of dimples 67. In addition, the axis CL is a radial axis that divides each region 61 symmetrically in the left-right direction.

As in Embodiment 5, the dimple group 64 arranged to form the curve 63 that is convex toward the sealed fluid side is arranged on the leakage side of the sliding surface S. The dimple group 64 is formed by arranging a predetermined number of sub dimple groups 64a, 64b, 64c, 64d, and so on with the land portions R interposed therebetween in the radial direction. The sub dimple groups 64a, 64b, 64c, 64d, and so on are arranged such that the long axes L of the dimples 62 are aligned to form the imaginary curve 63 having a curvature different from the curvature of the circumference of the sliding surface S. The curve 63 is a curve that is convex toward the sealed fluid side, and is formed of an arc, a parabola, a sine wave, a cycloid curve, or the like that has the curvature different from the curvature of the circumference of the sliding surface S. In addition, in the sub dimple groups 64a, 64b, 64c, 64d, and so on, the dimples 62 arranged in the vicinity of the axis CL are arranged closest to the sealed fluid side, and the dimples 62 arranged at both ends are arranged closest to the leakage side. In addition, the dimples 62 arranged at both ends of each of the sub dimple groups 64a, 64b, 64c, 64d, and so on may be arranged to be in contact with the leakage-side peripheral edge 5a or to be opened toward the leakage-side peripheral edge 5a. Further, the sub dimple groups 64a, 64b, 64c, 64d, and so on may be configured such that the dimples 62 are arranged symmetrically relative to the axis CL. For the sake of explanation, reference numerals of the sub dimple groups 64a, 64b, 64c, and 64d are shown only in a surrounding portion in FIG. 7. The number of sub dimple groups arranged in each region 61 is determined based on design conditions and the like.

As in Embodiment 5, the dimple group 69 arranged to form the curve 68 that is convex toward the leakage side is arranged on the sealed fluid side of the sliding surface S. The dimple group 69 is formed by arranging a predetermined number of sub dimple groups 69a, 69b, 69c, and so on with the land portions R interposed therebetween in the radial direction. The sub dimple groups 69a, 69b, 69c, and so on are arranged such that the long axes L of the dimples 67 are aligned to form the imaginary curve 68 having a curvature different from the curvature of the circumference of the sliding surface S. The curve 68 is a curve that is convex toward the leakage side, and is formed of an arc, a parabola, a sine wave, a cycloid curve, or the like that has the curvature different from the curvature of the circumference of the sliding surface S. In addition, in the sub dimple groups 69a, 69b, 69c, and so on, the dimples 67 arranged in the vicinity of the axis CL are arranged closest to the leakage side, and the dimples 67 arranged at both ends are arranged closest to the sealed fluid side. In addition, the dimples 67 arranged at both ends of each of the sub dimple groups 69a, 69b, 69c, and so on may be arranged to be in contact with the sealed-fluid-side peripheral edge 5b or to be opened toward the sealed-fluid-side peripheral edge 5b. Further, the sub dimple groups 69a, 69b, 69c, and so on may be configured such that the dimples 67 are arranged symmetrically relative to the axis CL. For the sake of explanation, reference numerals of the sub dimple groups 69a, 69b, and 69c are shown only in the surrounding portion in FIG. 7.

A groove portion 65 is provided between the dimple group 64 and the dimple group 69. The groove portion 65 is formed to be sufficiently deeper than depths of the dimples 62 constituting the dimple group 64 and the dimples 67 constituting the dimple group 69, and to be sufficiently larger than sizes of opening portions of the dimples 62 and the dimples 67.

The dimple group 64 that is provided on the leakage side of the sliding surface S and arranged to form the curve 63 that is convex toward the sealed fluid side suctions fluid from the leakage side, and thus exhibits favorable sealing performance. In addition, the dimple group 69 that is provided on the sealed fluid side of the sliding surface S and arranged so as to form the curve 68 that is convex toward the leakage side of the sliding surface S suctions fluid from the sealed fluid side and discharges pressurized fluid from the inside of the dimples 67 to the sliding surface S, and thus the sliding surface S can be maintained in a fluid lubricating state. By arranging the dimple group 64 having excellent sealing performance and the dimple group 69 having excellent lubricating performance on the sliding surface S in this manner, the mechanical seal 1 can exhibit excellent sealing performance and lubricating performance.

In addition, since the groove portion 65 is provided between the dimple group 64 and the dimple group 69, interference between the dimple group 64 and the dimple group 69 can be prevented. As a result, it is possible to prevent functions of the dimple group 64 that exhibits sealing performance and the dimple group 69 that exhibits lubricating performance from cancelling out each other in a region where the dimple group 64 and the dimple group 69 are close to each other.

The dimple group 64 is arranged substantially symmetrically relative to the axis CL so as to form the curve 63 that is convex toward the sealed fluid side, and therefore, the dimple group 64 exhibits favorable sealing performance not only during forward rotation but also during reverse rotation. Since the dimple group 69 is arranged substantially symmetrically relative to the axis CL so as to form the curve 68 that is convex toward the leakage side, the dimple group 69 exhibits a lubricating function not only during forward rotation but also during reverse rotation, and thus can exhibit favorable sealing performance and lubricating performance regardless of a rotation direction thereof.

As described above, the sliding component of Embodiment 6 has the following effects in addition to the effects of Embodiment 5.

In the mechanical seal of Embodiment 6, since the groove portion 65 is provided between the dimple group 64 and the dimple group 69, interference between the dimple group 64 and the dimple group 69 can be prevented. Asa result, it is possible to prevent the functions of the dimple group 64 that exhibits sealing performance and the dimple group 69 that exhibits lubricating performance from cancelling out each other in the region where the dimple group 64 and the dimple group 69 are close to each other.

Although the embodiments of the present invention have been described above with reference to the drawings, the specific configuration is not limited to these embodiments, and changes and additions without departing from the spirit of the present invention are also included in the present invention.

Although the outer peripheral side is the sealed fluid side while the inner peripheral side is the leakage side in the above embodiment, the present invention is not limited thereto, and the present invention is also applicable to a case where the inner peripheral side is the sealed fluid side while the outer peripheral side is the leakage side.

REFERENCE SIGNS LIST

1 mechanical seal
2 sleeve
3 rotation-side sealing ring
4 housing
5 fixed-side sealing ring
6 coiled wave spring
7 bellows
8 packing
9 casing
10 rotation shaft
11 region
12 dimple
14 dimple group
14*a* sub dimple group
14*b* sub dimple group
14*c* sub dimple group
14*d* sub dimple group
14*e* sub dimple group
14*f* sub dimple group
14*g* sub dimple group
21 region
22 dimple
24 dimple group
24*a* sub dimple group
24*b* sub dimple group
24*c* sub dimple group
24*d* sub dimple group
24*e* sub dimple group
24*f* sub dimple group
31 region
32 dimple
34 dimple group
34*a* sub dimple group
34*b* sub dimple group
34*c* sub dimple group
34*d* sub dimple group
34*e* sub dimple group
34*f* sub dimple group
34*g* sub dimple group
41 region
42 dimple
44 dimple group
44*a* sub dimple group
44*b* sub dimple group
44*c* sub dimple group
44*d* sub dimple group
44*e* sub dimple group
44*f* sub dimple group
44*g* sub dimple group
51 region
52 dimple
54 dimple group
54*a* sub dimple group
54*b* sub dimple group
54*c* sub dimple group
54*d* sub dimple group
57 dimple
59 dimple group
59*a* sub dimple group
59*b* sub dimple group
59*c* sub dimple group
61 region 62 dimple
64 dimple group
64a sub dimple group
64b sub dimple group
64c sub dimple group
64d sub dimple group
65 groove portion
67 dimple
69 dimple group
69a sub dimple group
69b sub dimple group
69c sub dimple group
K short axis
L long axis
R land portion
S sliding surface

The invention claimed is:

1. A sliding component comprising a pair of sliding members being slidable relative to each other on sliding surfaces of the sliding members,
   wherein at least one of the sliding surfaces includes a dimple group in which a plurality of dimples is arranged, each of the plurality of dimples having an opening portion a shape of which has a long axis and a short axis orthogonal to the long axis, and
   in the dimple group, the dimples are arranged so that a curve formed by connecting end points of long axes of the dimples or a curve formed by connecting end points of short axes of the dimples has a curvature different from a curvature of a circumference of the at least one of the sliding surfaces in which the dimple group is included, and
   wherein the curve has a radius and the radius remains constant.

2. The sliding component according to claim 1, wherein the dimple group includes a first dimple group in which the dimples are arranged along a curve that is convex toward a sealed fluid side of the sliding component.

3. The sliding component according to claim 2, wherein the first dimple group is arranged on a leakage side of the at least one of the sliding surfaces in which the first dimple group is included.

4. The sliding component according to claim 1, wherein the dimple group includes a second dimple group in which the dimples are arranged along a curve that is convex toward a leakage side of the sliding component.

5. The sliding component according to claim 4, wherein the second dimple group is arranged on a sealed fluid side of the at least one of the sliding surfaces in which the second dimple group is included.

6. The sliding component according to claim 1, wherein the dimple group includes:
   a first dimple group in which the dimples are arranged along a curve that is convex toward a sealed fluid side of the sliding component; and
   a second dimple group in which the dimples are arranged along a curve that is convex toward a leakage side of the sliding component.

7. The sliding component according to claim 6, wherein the first dimple group is arranged on the leakage side of the at least one of the sliding surfaces in which the second dimple group is included, and the second dimple group is arranged on the sealed fluid side of the at least one of the sliding surfaces in which the second dimple group is included.

8. The sliding component according to claim 6, further comprising:
   a circumferential groove extending in a circumferential direction and being disposed between the first dimple group and the second dimple group.

9. The sliding component according to claim 1, wherein the at least one of the sliding surfaces includes a plurality of regions partitioned by land portions each extending in a corresponding radial direction, and
   the dimple group is disposed in one of the plurality of regions.

10. The sliding component according to claim 1, wherein the opening portion of the dimple is elliptical.

* * * * *